United States Patent [19]

Inoue et al.

[11] Patent Number: 4,460,646

[45] Date of Patent: Jul. 17, 1984

[54] ADHESIVE RESIN COMPOSITION AND LAMINATE THEREOF

[75] Inventors: Hiroshi Inoue; Masaaki Isoi, both of Saitama; Kazuo Sei, Yokohama, all of Japan

[73] Assignee: Toa Nenryo Kogyo Kabushiki Kaisha, Tokyo, Japan

[21] Appl. No.: 359,344

[22] Filed: Mar. 18, 1982

[30] Foreign Application Priority Data

Apr. 7, 1981 [JP] Japan .................................. 56-51100

[51] Int. Cl.³ ............................................. B32B 15/00
[52] U.S. Cl. ................................... 428/344; 156/334; 428/355; 428/343; 525/193
[58] Field of Search ................ 525/193; 128/349, 355, 128/343, 344, 356; 156/334; 428/483, 476.3, 520, 461, 463

[56] References Cited

U.S. PATENT DOCUMENTS

| | | | |
|---|---|---|---|
| 3,987,122 | 10/1976 | Bartz et al. ......................... | 156/334 |
| 4,088,714 | 5/1978 | Huff .................................... | 525/193 |
| 4,255,533 | 3/1981 | Bartz .................................. | 525/193 |
| 4,283,317 | 8/1981 | Murphy et al. .................... | 156/334 |

FOREIGN PATENT DOCUMENTS

| | | |
|---|---|---|
| 46-4846689 | 10/1971 | Japan . |
| 48-504144 | 5/1973 | Japan . |
| 48-504189 | 5/1973 | Japan . |
| 50-5482 | 4/1975 | Japan . |
| 50-121058 | 4/1975 | Japan . |
| 50-1136735 | 5/1975 | Japan . |
| 50-25845 | 8/1975 | Japan . |
| 51-64257 | 11/1976 | Japan . |
| 52-4000083 | 6/1977 | Japan . |
| 54-6088447 | 12/1979 | Japan . |

*Primary Examiner*—George F. Lesmes
*Assistant Examiner*—E. Rollins Buffalow
*Attorney, Agent, or Firm*—R. L. Graham

[57] ABSTRACT

The adhesive resin composition and laminate disclosed herein comprises a mixture of linear low density polyethylene, and a synthetic rubber reacted with an unsaturated carboxylic acid or derivative thereof.

10 Claims, No Drawings

ADHESIVE RESIN COMPOSITION AND LAMINATE THEREOF

BACKGROUND OF THE INVENTION

1. Field of the Invention

The present invention relates to an adhesive resin composition and a laminate composed thereof. More particularly, the present invention relates to adhesive polyethylene-synthetic rubber composition.

2. Description of the Prior Art

Heretofore, it has been proposed to coat synthetic resins on metal pipes, metal plates, electric wires and cables, and wires in order to improve the corrosion resistance, external appearance, and food sanitation of metals, or to make laminates in combination with other resins in order to remedy the drawbacks inherent in a variety of synthetic resins. Physically and chemically superior polyolefins are considered to be promising for lamination with metals or synthetic resins. However, the non-polar polyolefins do not bond easily to metals and resins. In order to eliminate such a drawback, various means have been proposed.

For instance, Japanese unpatented Publication No. 52-8035 (1977) discloses a method for adding 1 to 20 wt. % of a rubber compound to high-pressure low-density polyethylene, low-pressure high-density polyethylene, or polypropylene and then modifying the mixture with an unsaturated carboxylic acid. Japanese unpatented Publication Nos. 54-82 (1979) and 54-83 (1979) disclose a method for laminating a modified polyolefin to nylon, polyester, or ethylene-vinyl acetate copolymer. According to this method modification is accomplished by reacting an unsaturated carboxylic acid or a derivative thereof with a mixture of 70 to 98 wt. % of high-pressure low-density polyethylene, low-pressure high-density polyethylene, or polypropylene and 30 to 2 wt. % of an ethylene-alpha-olefin copolymer having a crystallization degree less than 30%. According to these prior art technologies, an improvement is made in adhesiveness but the improvement in environmental stress cracking resistance (ESCR) and high-speed tensile elongation is not necessarily satisfactory.

SUMMARY OF THE INVENTION

In order to overcome the above-mentioned disadvantages, the present inventors carried out a series of researches which led to the findings that an adhesive polyolefin which is superior in ESCR, tensile strength, elongation, flowability, and toughness is obtained by reacting an unsaturated carboxylic acid or a derivative thereof with a mixture of linear low density polyethylene copolymer (abbreviated as L-LDPE hereunder) and synthetic rubber. The present invention is based on these findings.

The invention contemplates an improved adhesive resin composition and an improved laminate defined as follows:

(1) an adhesive resin composition which comprises a mixture of (A) linear low density polyethylene and (B) synthetic rubber, said mixture being reacted with an unsaturated carboxylic acid or a derivative thereof, said linear low density polyethylene being a copolymer of ethylene and alpha-olefin and having a density of 0.915 to 0.935 and the weight-average molecular weight/number-average molecular weight ratio (abbreviated as Mw/Mn hereunder) from 3 to 12, and (2) a laminate comprising an adhesive resin composition and a metal or thermoplastic resin, said adhesive resin composition being a mixture of (A) linear low density polyethylene and (B) synthetic rubber, said mixture being reacted with an unsaturated carboxylic acid or a derivative thereof, said linear low density polyethylene being a copolymer of ethylene and alpha-olefin and having a density of 0.915 to 0.935 and the Mw/Mn ratio from 3 to 12.

The adhesive resin composition of the present invention exhibits superior properties in ESCR, tensile strength, elongation, impact strength, bond strength, and flowability. It, accordingly is ideally suited for use in laminates.

DESCRIPTION OF THE PREFERRED EMBODIMENTS

The L-LDPE used in this invention is produced by copolymerizing ethylene with alpha-olefin selected from the group consisting of butene-1, pentene-1, hexene-1, 4-methylpentene-1, heptene-1, and octene-1, and preferably from the group consisting of butene-1, hexene-1, 4-methylpentene-1, and octene-1, at a ratio of 3 to 14 wt. % in the presence of a chromium catalyst or Ziegler catalyst by the gas phase method, liquid phase method, or solution method. L-LDPE thus produced has a density of 0.915 to 0.935, an Mw/Mn ratio of 3 to 12, and an MI of 0.1 to 50 g/10 min. [as measured by ASTM D-1238E (190° C., 2160 g); the same shall apply hereunder]. Most preferable among them is one which is produced by the gas phase method.

The synthetic rubber used in this invention includes a copolymer rubber of ethylene and an alpha-olefin selected from the group consisting of propylene, butene-1, pentene-1, hexene-1, octene-1, and 4-methylpentene-1; ethylene-propylene-nonconjugated diene rubber (EPDM), isoprene rubber (IR), butyl rubber (BR), and styrene-butadiene thermoplastic rubber (SBR). Preferable among them is ethylene-alpha-olefin copolymer rubber, and most preferable is ethylene-butene-1 copolymer rubber (EBR). These synthetic rubbers should preferably have a Mooney viscosity of 10 to 150 ($ML_{1+4}$ 100° C., JIS K6300 [the same shall apply hereunder]), and a crystallization degree less than 30%. Such ethylene-alpha-olefin copolymer rubbers have usually a density lower than 0.9.

The synthetic rubber should preferably be incorporated in an amount of 30 to 2 parts by weight to 70 to 98 parts by weight of L-LDPE. Synthetic rubber less than 2 parts by weight is not enough to improve ESCR, and synthetic rubber more than 30 parts by weight improves ESCR at the sacrifice of mechanical strength of the resulting product.

The unsaturated carboxylic acid used in this invention includes acrylic acid, methacrylic acid, maleic acid, fumaric acid, itaconic acid, citraconic acid, endo-bicyclo[2,2,1]-1,4,5,6,7,7-hexachloro-5-heptene-2,3-dicarboxylic acid, endo-bicyclo[2,2,1]-5-heptene-2,3-dicarboxylic acid, and cis-4-cyclohexene-1,2-dicarboxylic acid. The derivative of carboxylic acid used in this invention includes aced anhydrides and esters, such as maleic anhydride, citraconic anhydride, endo-bicyclo[2,2,1]-1,4,5,6,7,7-hexachloro-5-heptene-2,3-dicarboxylic acid anhydride, endo-bicyclo-[2,2,1]-5-heptene-2,3-dicarboxylic acid anhydride, cis-4-cyclohexene-1,2-dicarboxylic acid anhydride, methyl acrylate, methyl methacrylate, ethyl acrylate, ethyl methacrylate, butyl acrylate, butyl methacrylate, and maleate esters (monoester and diester).

The aforesaid unsaturated carboxylic acid or derivative thereof should preferably be added to L-LDPE in an amount of 0.05 to 5 parts by weight based on 100 parts by weight of said mixture of L-LDPE and synthetic rubber. These quantities result in the content of 0.05 to 3 wt. % of unsaturated carboxylic acid or derivative thereof in the resulting adhesive resin composition. If the content of the unsaturated carboxylic acid or a derivative thereof in the resulting composition is less than 0.01 wt. %, no improvement is made in adhesion; and conversely, if it is more than 3 wt. %, no further improvement is made in adhesion but gels and discoloration occur.

The reaction of aforesaid mixture of L-LDPE and synthetic rubber with an unsaturated carboxylic acid or a derivative thereof can be accomplished by any known method. For instance, aforesaid mixture of L-LDPE and synthetic rubber is mixed with an unsaturated carboxylic acid or a derivative thereof and an initiator of organic peroxide by a Henschel mixer or ribbon blender and then melted and kneaded by a Banbury mixer or a single- or multi-screw extruder at a temperature higher than the melting point of polyethylene but lower than 250° C. Examples of organic peroxides include di-t-butyl peroxide, 2,5-dimethyl-2,5-di-(t-butylperoxy)-hexyne-3, dicumyl peroxide, and benzoyl peroxide. For synthetic rubber in the form of bale, a Banbury mixer or roll mill is suitable for heating, melting, and mixing. The reaction may be carried out in such a manner that aforesaid mixture of L-LDPE and synthetic rubber is dissolved in a solvent and an unsaturated carboxylic acid or a derivative thereof and an initiator are added to the solution. The initiator should preferably be added in an amount of 0.001 to 0.5 part based on 100 parts of the mixture of L-LDPE and synthetic rubber.

The synthetic rubber in the composition of this invention may be modified previously by aforesaid unsaturated carboxylic acid or a derivative thereof.

The adhesive resin composition thus obtained may be used alone or in combination with L-LDPE, synthetic rubber, or modified products obtained by reaction with an unsaturated carboxylic acid or a derivative thereof. For example, the composition of this invention may be blended with (1) L-LDPE and/or synthetic rubber, (2) modified L-LDPE and/or modified synthetic rubber reacted with an unsaturated carboxylic acid or a derivative thereof, or (3) a mixture of L-LDPE and/or synthetic rubber and modified L-LDPE and/or modified synthetic rubber. These compounds may be mixed with the composition of this invention, followed by melting and kneading. The ratio of L-LDPE, synthetic rubber, and unsaturated carboxylic acid or derivative thereof added in the final composition should be 70 to 98 parts by weight, 30 to 2 parts by weight, and 0.01 to 3 wt. %, respectively, for reasons mentioned above.

Metals used for making the laminate of this invention include iron, aluminum, copper, zinc, nickel, tin, stainless steel, brass, galvanized steel, and tinplate. Thermoplastic resins used for making the laminate of this invention include polyamides such as nylon-6, nylon-66, nylon-11, nylon-12, nylon 6-10; polyolefin homopolymers or copolymers such as polypropylene and polybutene; partially acetalized polyvinyl alcohol (vinylon); partially hydrolyzed ethylene-vinyl acetate copolymer (eval); polyesters such as polyethylene terephthalate and polybutylene terephthalate; and polyvinyl chloride. Preferable among them are nylon and vinylon.

The laminate of this invention is obtained by laminating the composition of this invention or a mixture in which the composition of this invention is incorporated with unmodified or modified L-LDPE and/or synthetic rubber, with a member selected from the above-mentioned metals or thermoplastic resins.

The laminate of this invention can be produced by any known method; for example, a method for heat bonding members which have been previously formed into a film or sheet, a method for laminating layers outside the die, a method for laminating layers inside the die (coextrusion), an extrusion coating method, and powder coating. Usually, the metal layers to be laminated undergo preliminary treatment such as degreasing with solvent, pickling, shot blasting, and bonderizing. High bond strength between layers can be achieved by applying an epoxy resin primer. A modified epoxy resin primer of one-part system or two-part system is preferable from the standpoint of heat resistance and stability.

The laminate of this invention is basically of two-layer structure including one layer of the composition of this invention or a mixture containing as a major ingredient the composition of this invention and the other layer selected from the aforesaid metals and thermoplastic resins. Various combinations are possible as required. For example, the composition/a metal; the composition/a thermoplastic resin; a metal/the composition/a metal; a metal/the composition/a thermoplastic resin; and a thermoplastic resin/the composition/a thermoplastic resin. In addition, it is also possible to combine layers of other substances such as fiber, paper, and wood.

The adhesive resin composition of this invention adheres to aforesaid metals or thermoplastic resins with a high bond strength. Moreover, because of high flowability it can be used for powder coating, extrusion coating, and extrusion molding. Being superior in bond strength, ESCR, high-speed tensile elongation and toughness, the adhesive resin composition can also be used for coating of steel wires, electric wires, cables, metal plates, metal pipes, and metal inserts, and for lamination with multilayer films and sheets formed by coextrusion with a variety of resins and multilayered bottles and containers formed by multilayer blow molding.

The composition of this invention may be incorporated, as required, with a weathering agent, heat stabilizer, molding aid, anti-oxidant, colorant, and the like.

The invention is described in detail by the following examples. In Examples and Referential Examples, "parts" means "parts by weight", and the peel strength (which indicates adhesiveness), high-speed tensile elongation, and melt tensile strength were measured by the following methods.

(1) Peel strength

Preparation of test piece (A) Aluminum laminate

A three-layered laminate consisting of two aluminum sheets (0.1 mm thick) sandwiching an intermediate layer (0.1 mm thick) of the composition, was cut into a 25 mm wide specimen.

(B) Steel laminate

A two-layered laminate consisting of a bonderized steel plate (3.2×50×150 mm) and a layer (1 mm thick) of the composition, was cut into a 10 mm wide specimen. A gripping surface was formed by removing the resin layer, up to 20 mm from the end, using a sharp knife.

(C) Nylon laminate

A three-layered laminate consisting of two nylon-6 layers (0.1 mm thick) sandwiching an intermediate layer (0.1 mm thick) of the composition, was cut into a 25 mm wide specimen.

These specimens were measured for 90° peel strength on an Instron type universal tester.

(2) ESCR (in comformity with ASTM D-1693)
  (A) Test piece: 38×12.7×2 mm
  (B) Surface active agent: 10% aqueous solution of Igepal
  (C) Test temperature: 50° C.
(3) High-speed tensile elongation (JIS K6760)
  (A) Rate of pulling: 500 mm/min. ±10%
(4) Melt tensile strength The flowability was evaluated by measuring the tensile force required to pull at a constant rate the molten resin extruded from the orifice of a melt indexer under the following conditions.
  (A) Orifice: 2.095 mm$\phi$×8 mm
  (B) Test temperature: 190° C.
  (C) Extrusion rate of resin: 10 mm/min.
  (D) Take-up rate of resin: 5.5 m/min.
(5) Resistance to salt water The adhesion to a metal substrate was evaluated with a laminate test specimen prepared as follows: A pretreated iron plate, measuring 3.2 mm thick, 50 mm wide, and 150 mm long, was coated with an epoxy primer to a thickness of about 10 microns, followed by heating in an oven at 250° C. The hot iron plate was coated by fluidized-bed coating with powder of the resin composition, followed by curing in an oven. The coating thickness was 0.8 to 1.0 mm. After cooling, a rectangular cut, measuring 30 mm×100 mm, was made on the resin layer. This test specimen was dipped in a constant temperature bath at 50° C. containing 3% salt solution, and the time for the resin layer to come off from the substrate was measured.

EXAMPLES 1 to 12

The compositions of this invention were prepared by mixing at the ratios as shown in Table 1 L-LDPE, ethylene-butene-1 copolymer rubber (referred to as EBR hereunder, density: 0.880, MI: 4.0) or ethylene-propylene copolymer rubber (referred to as EPR hereunder, density: 0.880, MI: 4.0), maleic anhydride, acrylic acid, or endo-bicyclo-[2,2,1]-5-heptene-2,3-dicarboxylic acid anhydride (referred to as himic acid hereunder), and 2,5-dimethyl-2,5-di-(t-butylperoxy)-hexyne-3 (initiator). The resulting mixture was then melted and kneaded by an extruder at 220° C.

Table 1 shows the physical properties of the composition and peel strength of the laminates composed of the compositions and aluminum, iron, or nylon.

REFERENTIAL EXAMPLES 1 to 6

For comparison, modified L-LDPE alone, modified low-density polyethylene (LDPE) alone, modified high-density polyethylene (HDPE) alone, and a modified mixture of LDPE and EBR used in Example 1 were measured for physical properties and peel strength as in Example 1. The results are shown in Table 2.

TABLE 1

| 1 | 2 | 3 | 4 | 5 | 6 | 7 | 8 | 9 | 10 | 11 | 12 |
|---|---|---|---|---|---|---|---|---|----|----|----|
| 95 | 95 | 75 | 90 | 90 | 90 | 85 | 90 | 90 | 90 | 90 | 90 |
| 12.0 | 12.0 | 12.0 | 12.0 | 12.0 | 12.0 | 12.0 | 5.0 | 2.0 | 8.0 | 4.0 | 12.0 |
| 0.926 | 0.926 | 0.926 | 0.926 | 0.926 | 0.926 | 0.926 | 0.934 | 0.920 | 0.926 | 0.926 | 0.926 |
| 5.0 | 5.0 | 5.0 | 5.0 | 5.0 | 5.0 | 5.0 | 6.0 | 6.0 | 5.0 | 5.0 | 5.0 |
| Bu | Bu | Bu | Bu | Bu | Bu | Bu | Bu | Bu | Pe | Oc | Bu |
| EBR 5 | EBR 5 | EBR 25 | EBR 10 | EBR 10 | EBR 10 | EBR 15 | EBR 10 | EBR 10 | EBR 10 | EBR 10 | EBR 10 |
| MA | MA | MA | MA | HM | AA | MA | MA | MA | MA | MA | MA |
| 0.3 | 0.1 | 0.3 | 0.3 | 0.6 | 0.5 | 0.3 | 0.3 | 0.3 | 0.3 | 0.3 | 0.3 |
| 0.025 | 0.025 | 0.025 | 0.025 | 0.025 | 0.025 | 0.025 | 0.025 | 0.025 | 0.025 | 0.025 | 0.025 |
| 7.0 | 7.0 | 5.8 | 7.0 | 6.9 | 6.8 | 6.3 | 3.6 | 1.7 | 3.5 | 3.0 | 7.0 |
| 0.924 | 0.924 | 0.913 | 0.922 | 0.922 | 0.922 | 0.919 | 0.929 | 0.916 | 0.921 | 0.921 | 0.921 |
| 0.28 | 0.09 | 0.28 | 0.28 | 0.50 | 0.47 | 0.27 | 0.27 | 0.26 | 0.27 | 0.27 | 0.28 |
| 500 | 500 | >1000 | >1000 | >1000 | >1000 | >1000 | >1000 | >1000 | >1000 | >1000 | 300 |
| 700 | 700 | 700 | 700 | 700 | 700 | 700 | 700 | 700 | 700 | 700 | 550 |
| 0.7 | 0.7 | 0.8 | 0.7 | 0.7 | 0.7 | 0.8 | 1.0 | 2.0 | 1.0 | 1.3 | 0.7 |
| 6.0 | 6.0 | 7.0 | 6.5 | 6.5 | 6.0 | 6.0 | 6.0 | 7.0 | 7.0 | 7.0 | 6.0 |
| 4.5 | 4.5 | 5.5 | 4.5 | 5.0 | 5.0 | 5.5 | 5.5 | 6.0 | 6.0 | 6.5 | 5.0 |
| 12.0 | 10.0 | 17.0 | 14.0 | 14.0 | 13.0 | 15.0 | 15.0 | 16.0 | 15.0 | 16.0 | 13.0 |

Butene-1,
Oc: Octene-1,
Pe: Pentene-1
Maleic anhydride,
HM: Himic acid,
AA: Acrylic acid

TABLE 2

| Example No. | 1 | 2 | 3 | 4 | 5 | 6 |
|---|---|---|---|---|---|---|
| (type) | L-LDPE | L-LDPE | L-LDPE | HDPE | LDPE | LDPE |
| (parts) | 100 | 100 | 100 | 100 | 100 | 90 |
| MI (g/10 min) | 12.0 | 5.0 | 12.0 | 8.0 | 10.0 | 10.0 |
| Density (g/cc) | 0.926 | 0.934 | 0.926 | 0.960 | 0.919 | 0.919 |
| $\overline{M}w/\overline{M}n$ | 5.0 | 6.0 | 7.0 | — | — | — |
| Comonomer* | Bu | Bu | Pe | — | — | — |
| EBR (parts) | 0 | 0 | 0 | 0 | 0 | 10 |
| Unsaturated carboxylic acid** | MA | MA | MA | MA | MA | MA |
| Quantity (parts) | 0.3 | 0.3 | 0.3 | 0.3 | 0.3 | 0.3 |
| Perhexyne-2,5-benzoyl (parts) | 0.025 | 0.025 | 0.025 | 0.025 | 0.025 | 0.025 |

TABLE 2-continued

| Example No. | 1 | 2 | 3 | 4 | 5 | 6 |
|---|---|---|---|---|---|---|
| Physical Properties of adhesive compound | | | | | | |
| MI (g/10 min) | 7.6 | 4.0 | 7.0 | 3.0 | 6.5 | 5.0 |
| Density (g/cc) | 0.926 | 0.934 | 0.926 | 0.960 | 0.919 | 0.915 |
| Q'ty of carboxylic acid added (wt %) | 0.28 | 0.28 | 0.28 | 0.21 | 0.26 | 0.26 |
| ESCR F$_{50}$ (hours) | 7.0 | 25.0 | 30.0 | 1(—) | 1(—) | 4.0 |
| High-speed tensile elongation (%) | 400 | 480 | 550 | 20 | 280 | 500 |
| Melt tensile strength (g) | 0.7 | 1.0 | 0.8 | 2.0 | 4.0 | 4.5 |
| Peel strength | | | | | | |
| Fe (kg/cm) | 5.1 | 6.0 | 5.5 | 2.5 | 2.0 | 4.0 |
| Al (kg/2.5 cm) | 4.5 | 5.0 | 4.8 | 3.0 | 2.5 | 3.0 |
| Nylon-6 (kg/2.5 cm) | 11.0 | 11.0 | 11.0 | 4.0 | 4.0 | 6.0 |

Note:
*Bu: Butene-1, Pe: Pentene-1
**MA: Maleic anhydride

EXAMPLES 13 and 14

The adhesive resin composition obtained in Example 4 was incorporated at the ratios shown in Table 3 with L-LDPE and ethylene-butene-1 copolymer rubber as used in Example 1. The resulting compositions were measured for physical properties and 90° peel strength. The results are shown in Table 3.

TABLE 3

| Example No. | 13 | 14 |
|---|---|---|
| Adhesive resin composition (parts) | 40 | 20 |
| L-LDPE (parts) | 54 | 72 |
| Ethylene-butene-1 copolymer rubber (parts) | 6 | 8 |
| Physical Properties of adhesive compound | | |
| MI 190° C. (g/10 min) | 7.6 | 8.0 |
| Density (g/cc) | 0.922 | 0.922 |
| Q'ty of carboxylic acid added (wt %) | 0.11 | 0.05 |
| ESCR F$_{50}$ (hours) | >1000 | >1000 |
| High-speed tensile elongation (%) | 700 | 700 |
| Melt tensile strength (g) | 0.6 | 0.5 |
| Peel strength | | |
| Fe (kg/cm) | 6.0 | 6.0 |
| Al (kg/2.5 cm) | 5.5 | 5.0 |
| Nylon-6 (kg/2.5 cm) | 12.5 | 11.0 |

EXAMPLES 15 to 23

The composition obtained in Example 1 was evaluated for resistance to salt water by varying the pretreatment and primer. The laminate specimens with a coating thickness of 0.8 mm were prepared by fluidized-bed coating at 250° C. The specimens were dipped in 3% sodium chloride solution at 50° C. The results are shown in Table 4.

TABLE 4

| Example | Pretreatment | Primer | Cooling after coating | Initial bond strength (kg/cm) | Resistance to salt water (hour) |
|---|---|---|---|---|---|
| 15 | Calcium phosphate BP-602 | Epoxy | Water cooling | 12.0 | 360 |
| 16 | Calcium phosphate BP-402 | Epoxy | Natural cooling | 12.5 | >720 |
| 17 | Calcium phosphate BP-602 | Epoxy | Natural cooling | 12.5 | >720 |
| 18 | Shot blasting #60 | Epoxy | Natural cooling | 7.5 | >720 |
| 19 | Pickling 15% HCl | Epoxy | Natural cooling | 5.0 | 480 |
| 20 | Degreased by trichlene | Epoxy | Water cooling | 3.0 | 240 |
| 21 | Shot blasting #60 | None | Natural cooling | 3.0 | 48 |
| 22 | Calcium phosphate BP-602 | None | Natural cooling | 6.0 | 72 |
| 23 | Zinc phosphate BP-402 | None | Water cooling | 5.5 | 48 |

What is claimed is:

1. An adhesive resin composition which comprises a mixture of (A) from 70 to 98 parts by weight of linear low density polyethylene and (B) and from 2 to 30 parts by weight of synthetic olefin or butyl rubber, said mixture being reacted with an unsaturated carboxylic acid or a derivative thereof, said linear low density polyethylene being a copolymer of ethylene and 3 to 14 weight percent alpha-olefin and having a density of 0.915 to 0.935 and the weight-average molecular weight/number-average molecular weight ratio from 3 to 12 and being substantially free of long chain branching.

2. A composition as claimed in claim 1, wherein said alpha-olefin is an olefin selected from the group consisting of butene-1, hexene-1,4-methylpentene-1, and octene-1.

3. A composition as defined in claim 2 wherein the synthetic rubber is a copolymer rubber of ethylene and butene-1.

4. A composition as claimed in claim 1, wherein the synthetic rubber is a copolymer rubber of ethylene and butene-1 or propylene.

5. A composition as claimed in claim 1, wherein the synthetic rubber has a Mooney viscosity of 10 to 150 and a crystallization degree less than 30%.

6. A composition as defined in claim 1, wherein the carboxylic acid is present in a concentration of between 0.01 and 3 weight percent of the composition.

7. A laminate comprising a layer of an adhesive resin composition and a layer of a material selected from the group consisting of a metal and thermoplastic resin, said adhesive resin composition being a mixture of (A) from 70 to 98 parts by weight of linear low density polyethylene and (B) from 2 to 30 parts by weight of synthetic olefin or butyl rubber, said mixture being reacted with an unsaturated carboxylic acid or a derivative thereof, said linear low density polyethylene being a copolymer of ethylene and 3 to 14 weight percent alpha-olefin and having a density of 0.915 to 0.935 and the weight-average molecular weight/number-average molecular weight ratio from 3 to 12 and being substantially free of long chain branching.

8. A laminate comprising:
(a) a layer of a mixture comprising (i) from 70 to 98 weight percent of an adhesive resin composition comprising a linear low density polyethylene which is a copolymer of ethylene and 3 to 14 weight percent alpha-olefin and having a density of 0.915 to 0.935 and being substantially free of long chain branching; and (ii) from 2 to 30 weight percent of a copolymer rubber selected from the group consisting of ethylene/butene-1 and ethylene/propylene, said mixture being reacted with an unsaturated carboxylic acid or derivative thereof; and
(b) a layer of a material selected from the group consisting of a metal and a thermoplastic.

9. A laminate as defined in claim 8, wherein the copolymer rubber is an ethylene-butene-1 copolymer rubber, and the metal is selected from the group consisting of iron, aluminum, copper, zinc, nickel, tin, steel, brass and tinplate.

10. A laminate as defined in claim 8, wherein the thermoplastic is selected from the group consisting of polyamides, polyolefin homopolymers and copolymers, partially acetalized polyvinyl alcohol, partially hydrolyzed ethylene-vinyl acetate copolymer, polyesters and polyvinyl chloride.

* * * * *